United States Patent [19]

Reynolds et al.

[11] Patent Number: 4,630,630
[45] Date of Patent: Dec. 23, 1986

[54] HYDROSTATIC HYDRAULIC COUPLING

[75] Inventors: Desmond H. J. Reynolds; Philip A. Taft, both of West Midlands, England

[73] Assignee: Lucas Industries Public Limited Company, Birmingham, England

[21] Appl. No.: 697,767

[22] Filed: Feb. 4, 1985

[30] Foreign Application Priority Data

Feb. 8, 1984 [GB] United Kingdom ............... 8403370

[51] Int. Cl.⁴ ............................................. F16K 17/14
[52] U.S. Cl. .................................. 137/68.1; 137/883; 137/71; 285/4; 285/99
[58] Field of Search .................... 137/68 R, 71; 285/3, 285/4, 13, 14, 99

[56] References Cited

U.S. PATENT DOCUMENTS

| 2,160,137 | 5/1939 | Froussard | 137/68 R |
| 2,667,184 | 1/1954 | Hailer | 285/14 X |
| 3,044,479 | 7/1962 | Meyer | 137/68 R |
| 3,986,508 | 10/1976 | Barrington | 285/3 X |
| 4,235,347 | 11/1980 | Cothier | 137/68.1 X |
| 4,265,280 | 5/1981 | Ammann | 285/3 X |

FOREIGN PATENT DOCUMENTS

| 1475799 | 3/1969 | Fed. Rep. of Germany | 285/3 |
| 2362527 | 6/1975 | Fed. Rep. of Germany | 285/3 |
| 2427381 | 7/1975 | Fed. Rep. of Germany | 285/3 |

Primary Examiner—Harold W. Weakley
Attorney, Agent, or Firm—Helman & Stern

[57] ABSTRACT

A fluid-tight connection between a pair of pipes containing hydraulic fluid is formed by a pair of connectors of the invention. Each connector has a body part engaged respectively with the pipes, the body parts being coupled together by a coupling sleeve which engages a shoulder 20 of one of the body parts and is locked to the body parts by a circlip 23 engaged within grooves 22 and 25 respectively in the other body part and the sleeve. Each body part has a respective seal member each incorporating a diaphragm sealing over an end of its associated body part and a bead engaging the internal wall of the sleeve. Air trapped between the diaphragms is expelled past the seal members during insertion of the connector parts into the sleeve. Application of system pressure subsequently ruptures the diaphragms to establish communication between the pipes and urges the seals outwardly to seal against leakage of system fluid.

11 Claims, 3 Drawing Figures

HYDROSTATIC HYDRAULIC COUPLING

BACKGROUND OF THE INVENTION

1. Field of the Invention

This invention relates to a connector for forming fluid-tight connections between the fluid-carrying pipes of an hydraulic system or for connecting one or more such pipes to a fluid pressure-operated unit incorporated in an hydraulic system. The coupling device of the invention is primarily for use with vehicle hydraulic clutch and brake actuating systems.

2. Description of the Prior Art

In conventional vehicle assembly operations, still in widespread use, the individual components of an hydraulic system, such as a clutch system for example, are installed in a vehicle, interconnected by pipes, filled with fluid and bled to remove any entrapped air. Such an installation procedure is time-consuming and therefore expensive, and is by no means ideal for performance on a rapidly moving vehicle assembly line. It is possible to pre-fill individual units, such as master and slave cylinders, and store them until required for use, but the stored units must be sealed against leakage in a manner permitting their subsequent rapid installation and the formation of hydraulic connections without ingress of air. Conventional attepts to achieve this have proved to be unsatisfactory.

In a known proposal, illustrated in British Pat. No. 1132443, a connecting device is used to assemble a pair of pre-filled hydraulic circuit portions of which the ends are sealed by diaphragms, the device including a puncturing element located therein which acts to rupture the diaphragms, during assembly of the circuit portions by means of said device, in order to establish communication between the circuit portions. This proposal is unsatisfactory, in practice, because the inclusion of the internal rupturing device inevitably leads to the entrapment of air and the suggested method of air exclusion, prior filling of the space containing the puncturing device, is unreliable and not suited to the rapid assembly techniques required on a production line.

BRIEF SUMMARY OF THE INVENTION

An object of the invention is to provide a connector for forming a fluid-tight connection between pre-filled parts of hydraulic system, in which the aforesaid drawbacks are minimized or avoided.

According to the present invention, a connector for use in a pre-filled hydraulic system comprises a body adapted to form part of said system and including a diaphragm arranged to seal said system part, and coupling means operable to connect said body to another part of the system, sealing means arranged to form a fluid-tight seal between said system part and a surrounding surface, the connector providing a normally closed air leakage path which, when open, provides communication between the outer side of the diaphragm and atmosphere, said path being closed by a seal which acts to open the path when said system parts are brought together for connection by said coupling means, whereby air entrapped between said parts is allowed to be expelled from the system through said path, said diaphragm being such as to rupture under the effect of hydraulic system pressure applied thereto, so as to establish fluid communication between said system parts, after connection of the system parts by said coupling means.

In one convenient arrangement, said sealing means and said path seal are embodied in a single seal component which, preferably, also embodies the diaphragm.

The sealing means is preferably arranged to provide an area over which the system pressure, in use, acts to cause the path seal to close said path, and preferably also to enhance the sealing effect of the sealing means against leakage of system pressure fluid to the exterior. Said leakage path may be formed as a passage through the coupling means which surround portions of system parts when in connecting position thereon.

In one practical arrangement, said another part of the system is also provided with a further diaphragm-sealed body, the bodies being interconnected, in use, by said coupling means with the diaphragms in contiguous relationship, the diaphragms of both parts being such as to rupture upon the application of system pressure to one of said parts.

Preferably, the coupling means is a sleeve into which said bodies are inserted respectively from opposite ends, and includes one or more locking devices operable to lock the sleeve to said bodies against at least axial and preferably both axial and rotational movement relative to the bodies.

Advantageously, the, or each, diaphragm may be provided with one or more zones or lines of weakness to facilitate rupture thereof under system pressure.

BRIEF DESCRIPTION OF THE DRAWINGS

The invention will now be described, by way of example, with reference to the accompanying drawings wherein.

DETAILED DESCRIPTION

Figure 1:
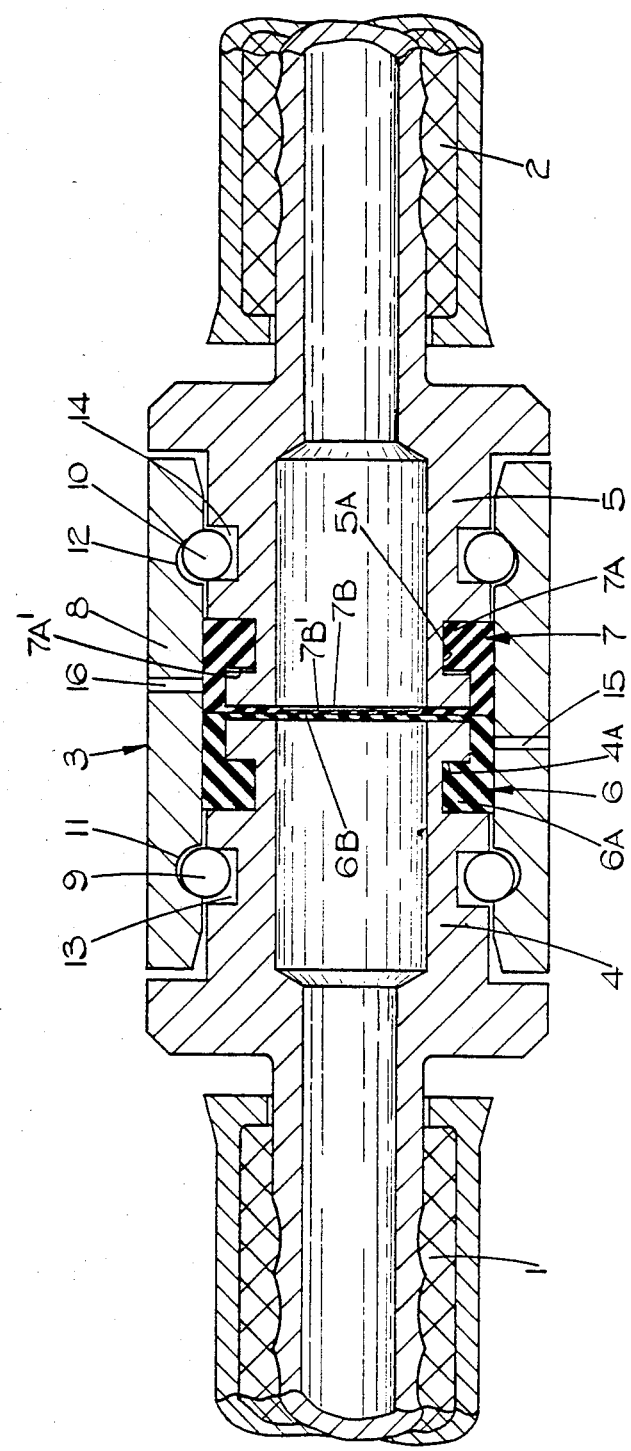
FIG. 1 is a longitudinal cross-sectional view of a portion of an hydraulic system incorporating parts interconnected by a connector arrangement of the invention.

Referring to the drawing, this illustrates a pair of hydraulic pipes 1, 2, which would normally be of semi-rigid plastics material, interconnected by a coupling arrangement indicated generally at 3. The pipes 1 and 2 would be connected respectively, for example, to a drive-operated master cylinder and a slave cylinder of a component, such as a clutch, to be actuated by the master cylinder.

Each pipe 1, 2 terminates in a respective connector part 4, 5, which parts are retained in co-operative working relationship by the connector arrangement 3, in the manner to be described.

The free ends of the connector parts 4, 5 are provided with respective cap-like seal members 6, 7 provided with peripherial beads 6A, 7A which engage in corresponding grooves 4A and 5A of the connector parts 4 and 5 to retain the seal members in position. Each seasl member has a portion in the form of a diaphragm 6B, 7B which covers the open mouth of the associated connector part. This arrangement enables the respective assemblies consisting of the aforesaid hydraulic units, their associated supply pipes and connector parts to be pre-filled with hydraulic fluid and stored until required for use, leakage of fluid from the connector parts 4 and 5 being precluded by the diaphragms 6B, 7B.

The coupling arrangement 3 is in the form of a cylindrical sleeve 8 which, in use, surrounds the adjacent end portions of the connector parts 4 and 5 and is locked thereto by respective U-clips or similar locking devices, 9, 10 engaging in corresponding recesses 11, 12 of the sleeve and opposed recesses 13, 14 in the respective connector parts 4, 5. The locking devices may alternatively form part of either the connector parts or of the coupling arrangement 3. This coupling arrangement effectively holds the connector parts in positions such that the diaphragms 6B, 7B are in contiguous relationship and prevents relative axial and rotational movement between the parts 4, 5.

It will be seen that the separately stored components and their associated pipes and connector parts may be simply connected together, when required for use, by insertion of the connector parts into the sleeve 8 and locking them in position by means of the locking devices 9 and 10. For example, in the case of a clutch master cylinder and its associated slave cylinder, these components, bith in re-filled condition, may be mounted at desired locations in a vehicle and then connected together in working relationship by interconnecting the connector parts 4 and 5 by means of the sleeve 8.

A pair of passages 15, 16 through the walls of the sleeve, provide communication between the interior of the sleeve and atmosphere. In the condition shown, the passages are closed by portions of the seals 6, 7 lying across the inner ends of the passages. As the connector parts 4, 5 are moved into the sleeve, air is inevitably trapped by the seals in the space formed between the diaphragms 6B, 7B and the trapped air is placed under increasing pressure as the connector parts are moved towards one another. The pressure forces the trapped air past the seals 6, 7, enabling it to escape through the passages 15, 16 and this process continues until the parts 4, 5 are fully inserted into the sleeve 8 and the diaphragms are brought into contiguous relationship, as shown in the drawing, so that all of the excluded air is expelled through the passages 15, 16.

The diaphragms are adequate to prevent leakage of hydraulic fluid from the sealed systems in their unpressurized state, but are such as to rupture under the application of system pressure. For this purpose they may be provided with one or more weakened zones or lines to facilitate their rupture, although this is not essential since the diaphragms may be inherently weak enough to permit their rupture without the assistance of additional weakness. When zones of weakness are provided, they are typically in the form of linear zones of less thickness than the remainder, such zones being conveniently in a cruciform arrangement in which the zones intersect substantially at the center of the diaphragm. Once such line of weakness is illustrated at 7B' in the right-hand side of FIG. 1, from which it can be seen that the line lies wholly within the area bounded internally by the adjacent body portion. As a result of the weakness zones or inherent diaphragm weakness, the first application of system pressure ruptures the diaphragms and thereby interconnects the system parts hydraulically, enabling the master cylinder to operate the slave cylinder.

The hydraulic system pressure acting, in use, on the internal surfaces of the seals will enhance the sealing effect of the seals against the adjacent surfaces of the connector parts and sleeve and will thereby cause the seals to seal off the passages 15, 16 against fluid leakage under system pressure. Sealing may be further enhanced by slight squashing and bulging of the seals when the diaphragms are brought together during assembly. It can be preferred to provide clearance between the seal beads 6A, 7A and one or more surfaces of the adjacent body, as illustrated at 7A' in the right-hand side of FIG. 1, in order to accommodate expansion of the seal, in use.

Figure 2:
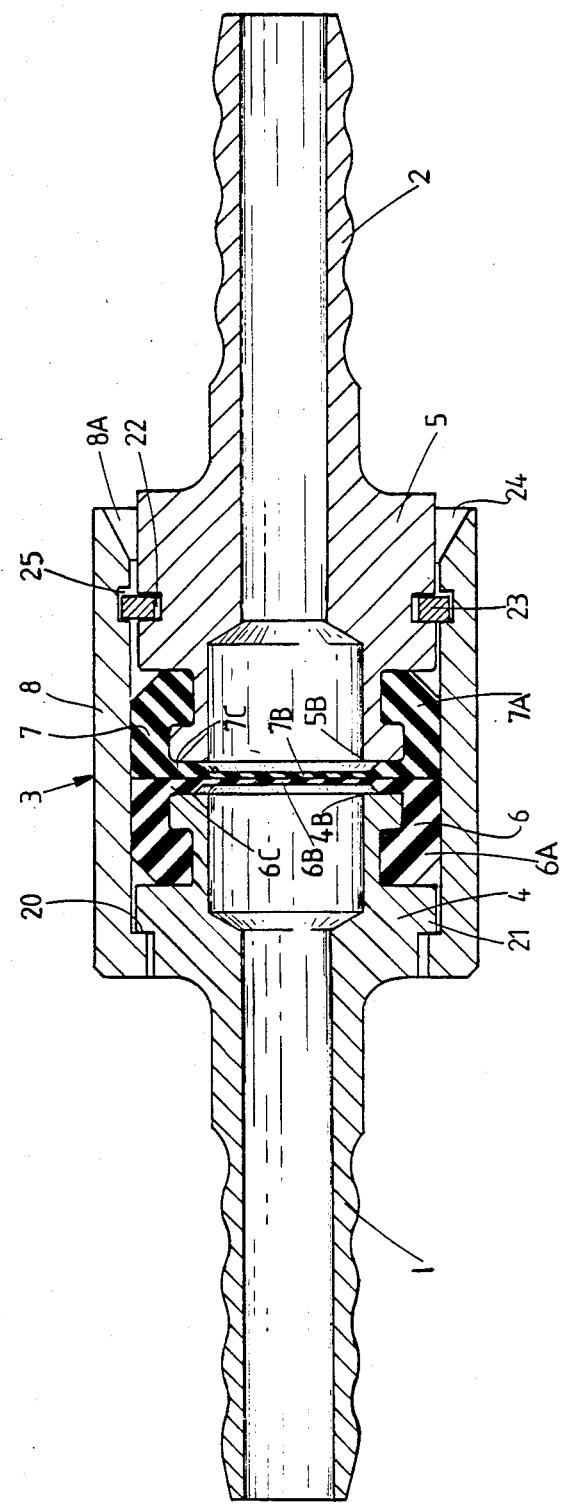
FIG. 2 is a view similar to FIG. 1 of another embodiment of the invention.

The embodiment of FIG. 2 is essentially similar to that of FIG. 1, differeing mainly in the nature of the coupling arrangement 3 and the shape of the seal members 6 and 7. In this embodiment, the sleeve 8 of the coupling arrangement is provided with an internal shoulder 20 against which bears a flange 21 of the connector part 4, which is inserted into the sleeve through the opposed open end 8A of the latter. The connector part 5 is also inserted into the sleeve through the open end 8A and has a peripheral groove 22 which houses a resilient circlip or the like 23. During insertion of the part 5 into the sleeve, the circlip 23 is radially inwardly compressed by engagement with a bevelled surface 24 at the sleeve mouth until the circlip registers with an internal groove 25 of the sleeve, whereupon it snaps outwardly into the groove 25 to retain the connector parts 4, 5 within the sleeve.

In this embodiment the diaphragms 5B, 6B are formed by recessing the seal members 6, 7 over an area approximately corresponding to the adjacent connector part orifice, leaving thicker radially outward portions 6C, 7C lying against the adjacent connector part surfaces. This arrangement ensures that when the diaphragms 6B, 7B rupture under system pressure, the rupture, which occurs diametrically, is contained by the portions 6C, 7C and does not reach the radially outer edges of the seal members. Rupturing of the diaphragm may be assisted by engagement of the diaphragm with the relatively sharp edges 4B, 5B of the connector parts. Additionally or alternatively, the diaphragms may be provided with linear zones of weakness in the form, for example, of those illustrated and described in relation to FIG. 1.

No specific passage is provided, equivalent to 15, 16 of FIG. 1, the leakage path for entrapped air being past the radially outer edges of the seal members. Apart from the operation of the coupling sleeve described above, the connector of this embodiment functions in a similar manner to that of FIG. 1, enabling the connector parts to be brought together without air being trapped between the diaphragms and the system parts to be hydraulically interconnected by rupture of the diaphgrams in the manner described.

Figure 3:
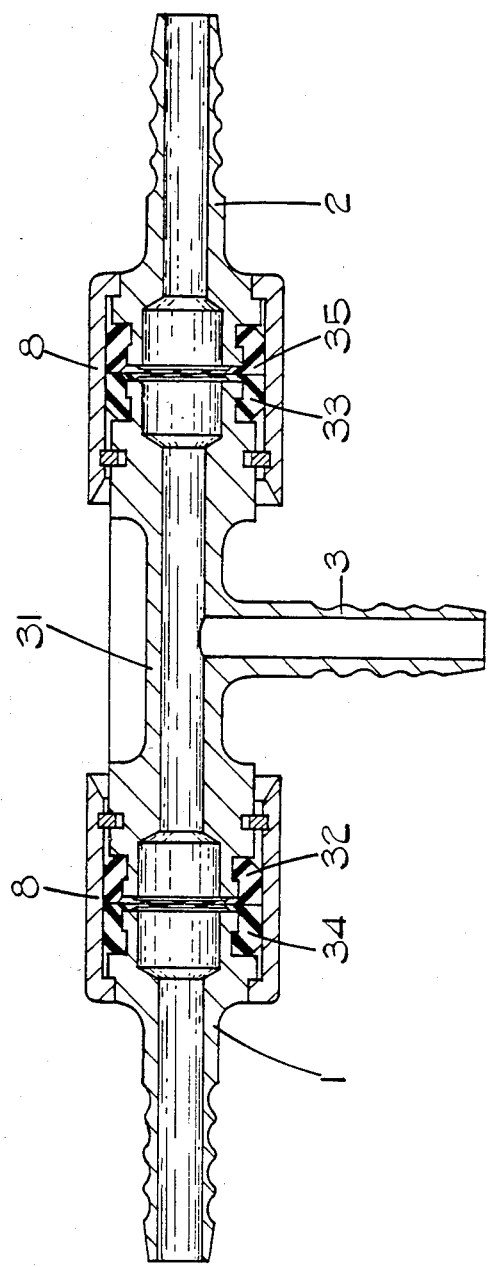
FIG. 3 is a view similar to FIG. 1 showing part of another hydraulic system incorporating a plurality of connectors of the invention.

The arrangement illustrated in FIG. 3 is an example of the coupling of the invention employed in a multiple connector enabling a pair of lines 1, 2 to be coupled to a third line 30 by means of a 'T' connector. The body 31 of the T is closed at two opposed extremities thereof by respective cap-like seal members 32, 33 arranged in similar manner to those of FIG. 2 for example, the ends of pipes 1 and 2 being provided with corresponding preferably identical seal members 34, 35. A pair of coupling sleeves 8 is provided to couple the respective pipes 1 and 2 to the T, the sleeves being arranged and held in position in the same manner as in the FIG. 2 embodiment, although alternative coupling means, such as that of FIG. 1 for example, could be used. The operation of each coupling of the T is as described in detail in relation to FIGS. 1 and 2. The concept of a multiple connector embodying the invention may be extended to any desired number of pipes to be connected to a body having a corresponding number of branches.

The invention will be seen to provide a simple and effective connector which enables pre-filled hydraulic system parts to be rapidly interconnected without retention of air therein and this enables such system parts to be installed in a vehicle in pre-filled condition and subsequently connected without the necessity for bleeding of the composite system. The connector illustrated may be modified in various ways. For example, the diaphragms 6B, 7B may be separate from the seals 6, 7, although the composite diaphragm and seal arrangement illustrated is preferred. One of the connector parts may be associated directly with a component, such as a clutch slave cylinder, instead of with a length of pipe, as shown. Again, the coupling sleeve 8 may be integral with or permanently secured to one of the system parts. The connector of the invention may be used with either flexible or rigid hydraulic pipes.

What is claimed is:

1. A connector for use in a hydraulic system comprising:

first and second body members forming parts of the hydraulic system and each having first and second channel means, respectively, through which hydraulic fluid passes when in use;

a first and second diaphragm mounted on said first and second body members, respectively, and between said first and second channel means for sealing said first and second channel means to prevent flow of fluid therethrough;

a tubular sleeve coupling member having open ends into which said body members are insertable for coupling said first and second body members together in a coupling position so that said diaphragms are in contiguous relationship;

means integral with each respective diaphragm to cause rupture of each diaphragm, respectively, at a predetermined hydraulic system pressure to facilitate flow through and between said first and second channel means in use;

first sealing means for each of said first and second body members forming a fluid-tight seal between the respective body member and the inner surface of said tubular sleeve coupling member surrounding said respective body member;

at least one normally closed air leakage path which, when open, provides communication between the ambient atmosphere and space between said body members and said diaphragms;

second sealing means operatively disposed in said at least one air leakage path for normally closing said air leakage path when said tubular sleeve coupling member is applied for coupling said first and second body members together, and for allowing air entrapped between said body members and said diaphragms to be expelled through said path; and at least one locking device operatively engageable between at least one of said first and second body members and said tubular sleeve coupling members for locking said at least one body member and said tubular sleeve coupling member against relative axial and rotational movement comprising, grooves formed respectively in said tubular sleeve coupling member and said at least one of said body members, said grooves being positioned to be juxtaposed when said at least one of said body members is in said coupling position in said tubular sleeve coupling member, and a U-shaped clip removably engageable in said grooves.

2. A connector for use in a hydraulic system comprising:

first and second body members forming parts of the hydraulic system and each having first and second channel means, respectively, through which hydraulic fluid passes when in use;

a first and a second diaphragm mounted on said first and second body members, respectively, and between said first and second channel means for sealing said first and second channel means to prevent flow of fluid therethrough;

a tubular sleeve coupling member having open ends into which said body members are insertable for coupling said first and second body members together in a coupling position so that said diaphragms are in contiguous relationship;

means integral with each respective diaphragm to cause rupture of each diaphragm, respectively, at a predetermined hydraulic system pressure to facilitate flow through and between said first and second channel means in use;

first sealing means for each of said first and second body members forming a fluid-tight seal between the respective body member and the inner surface of said tubular sleeve coupling member surrounding said respective body member;

at least one normally closed air leakage path which, when open, provides communication between the ambient atmosphere and space between said body members and said diaphragms;

second sealing means operatively disposed in said at least one air leakage path for normally closing said air leakage path when said tubular sleeve coupling member is applied for coupling said first and second body members together, and for allowing air entrapped between said body members and said diaphragms to be expelled through said path; and at least one locking device operatively engageable between at least one of said first and second body members and said tubular sleeve coupling members for locking said at least one body member and said tubular sleeve coupling member against relative axial and rotational movement comprising, grooves formed respectively in said tubular sleeve coupling member and said at least one of said body members, said grooves being positioned to be juxtaposed when said at least one of said body members is in said coupling position in said tubular sleeve coupling member, and a resilient circlip removably engageable in said grooves.

3. A connector as claimed in claim 2 wherein each of said first and second sealing means comprises a single seal member.

4. A connector as claimed in claim 3 wherein each of said first and second diaphragms comprises an integral part of the respective single seal member.

5. A connector as claimed in claim 2 wherein each of said second sealing means has an area thereon on which the system pressure acts to urge said second sealing means into the normally closed position.

6. A connector as claimed in claim 4 wherein each of said second sealing means has an area thereon on which the system pressure acts to urge said second sealing means into the normally closed position.

7. A connector as claimed in claim 2 wherein at least one of said first sealing means has an area thereon on which the system pressure acts to enhance the sealing effect of said at least one first sealing means against leakage of the system pressure fluid to the ambient atmosphere 8. A connector as claimed in claim 4 wherein at least one of said first sealing means has an area thereon on which the system pressure acts to enhance the sealing effect of said at least one first sealing means against leakage of the system pressure fluid to the ambient atmosphere.

9. A connector as claimed in claim 2 wherein:
said means to cause rupture of each diaphragm comprises zones of reduced thickness in each diaphragm to provide weakened regions.

10. A connector as claimed in claim 2 wherein:
said at least one air leakage path comprises at least one radial passage through said tubular sleeve coupling member.

11. A connector as claimed in claim 2 wherein:
said second body member comprises a T-shaped pipe connector having two branches each connected to a respective first body member and having respective ones of said tubular sleeve coupling members, diaphragms, first sealing means, second sealing means, air leakage path and means integral with each of said diaphragms to cause rupture thereof, so that rupture of said diaphragms by said predetermined system pressure produces communication between said channels in said first body members and the third branch of said T connector.

* * * * *